United States Patent
Foth et al.

(10) Patent No.: US 9,165,411 B2
(45) Date of Patent: Oct. 20, 2015

(54) METHOD AND SYSTEM FOR EMBEDDING MAILER SPECIFIED MAILING INSTRUCTIONS ON A MAIL PIECE TO AUTOMATE MAIL PROCESSING

(75) Inventors: Thomas J. Foth, Trumbull, CT (US); James A. Euchner, Waccabuc, NY (US); Jill M. Lawrence, Bridgeport, CT (US); Donna L. Gambino, Stratford, CT (US); Michael P. Swenson, Danbury, CT (US); Theresa Biasi, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 2580 days.

(21) Appl. No.: 11/303,703

(22) Filed: Dec. 16, 2005

(65) Prior Publication Data

US 2007/0143125 A1 Jun. 21, 2007

(51) Int. Cl.
G06Q 99/00 (2006.01)
G07B 17/00 (2006.01)
G06Q 10/08 (2012.01)

(52) U.S. Cl.
CPC ...... *G07B 17/00024* (2013.01); *G06Q 10/0834* (2013.01); *G07B 2017/0037* (2013.01); *G07B 2017/00379* (2013.01)

(58) Field of Classification Search
USPC .............................. 705/1, 401, 406, 407, 410
See application file for complete search history.

(56) References Cited

U.S. PATENT DOCUMENTS

| | | | |
|---|---|---|---|
| 4,992,649 A | 2/1991 | Mampe et al. | |
| 5,043,908 A | 8/1991 | Manduley et al. | |
| 5,291,002 A | 3/1994 | Agnew et al. | |
| 5,420,403 A | 5/1995 | Allum et al. | |
| 5,493,106 A | 2/1996 | Hunter | |
| 5,524,536 A | 6/1996 | Moizeau | |
| 6,064,994 A | 5/2000 | Kubatzki et al. | |
| 6,226,626 B1 | 5/2001 | Thiel | |
| 6,276,535 B1 | 8/2001 | Winkelman et al. | |
| 6,282,525 B1 * | 8/2001 | Kubatzki et al. | ............. 705/410 |

(Continued)

FOREIGN PATENT DOCUMENTS

EP 14423801 A1 8/2004

OTHER PUBLICATIONS

Tsuruta, S et al, Delivery route scheduling method combining knowledge-base with general algorithms, Systems, Man, and Cybernetics, 2000 IEEE International Conference, 2000, pp. 307-312 vol. 1.*

*Primary Examiner* — Akiba Allen
(74) *Attorney, Agent, or Firm* — Brian A. Lemm; Charles R. Malandra, Jr.; Steven J. Shapiro (57) ABSTRACT

Methods and systems that allow a sender of a mail piece to easily specify delivery instructions and/or services for a mail piece and that allows mail processing systems to identify and account for the specified delivery instructions and/or services without the need for any pre-sorting or input of information prior to processing the mail piece. The sender of a mail piece provides a marking on the mail piece representing instructions desired for delivering the mail piece. A mail processing system utilized to process the mail piece reads the marking provided on the mail piece, and based on the type/color of the marking, interprets the delivery instructions requested by the sender. The mail processing system processes the mail piece according to the instructions requested by the sender based on the marking provided on the mail piece by the sender.

28 Claims, 4 Drawing Sheets

(56) References Cited

U.S. PATENT DOCUMENTS

| | | |
|---|---|---|
| 6,321,214 B1 | 11/2001 | Thiel |
| 6,412,255 B2 | 7/2002 | Hidding et al. |
| 6,571,223 B1 | 5/2003 | Vaghi |
| 6,622,133 B1 * | 9/2003 | Park et al. ............... 705/401 |
| 6,625,141 B1 | 9/2003 | Glitho et al. |
| 6,692,033 B2 | 2/2004 | Miller et al. |
| 6,795,813 B2 | 9/2004 | Allport et al. |
| 6,963,861 B1 | 11/2005 | Boucher et al. |
| 7,451,119 B2 * | 11/2008 | Elliot et al. ............... 705/401 |
| 2004/0118089 A1 | 6/2004 | Riccardi |
| 2004/0243522 A1 | 12/2004 | Foth et al. |

* cited by examiner

METHOD AND SYSTEM FOR EMBEDDING MAILER SPECIFIED MAILING INSTRUCTIONS ON A MAIL PIECE TO AUTOMATE MAIL PROCESSING

FIELD OF THE INVENTION

The invention disclosed herein relates generally to mail processing systems, and more particularly to a method and system for automating the processing of mail pieces being processed by mail processing systems.

BACKGROUND OF THE INVENTION

Mail processing systems for preparing mail pieces, e.g., generating and printing postage indicia on envelopes and other forms of mail pieces, have long been well known and have enjoyed considerable commercial success. There are many different types of mail processing systems, ranging from relatively small units that handle only one mail piece at a time, to large, multi-functional units that can process thousands of mail pieces per hour in a continuous stream operation. The larger mailing machines often include different modules that automate the processes of producing mail pieces, each of which performs a different task on the mail piece. The mail piece is conveyed downstream utilizing a transport mechanism, such as rollers or a belt, to each of the modules. Such modules could include, for example, a singulating module, i.e., separating a stack of mail pieces such that the mail pieces are conveyed one at a time along the transport path, a moistening/sealing module, i.e., wetting and closing the glued flap of an envelope, a weighing module, and a metering module, i.e., applying evidence of postage to the mail piece. The exact configuration of the mailing machine is, of course, particular to the needs of the user.

Typically, in most office environments, the preparation of a mail piece for sending to a recipient occurs in several discrete steps. In many situations, each of the steps are performed by a different party. For example, the contents of the mail piece, e.g., a letter or the like, is typically prepared by the sender (or the sender's assistant) using a personal computer, word processor or the like. After the contents has been completed and, if necessary, signed, the contents are provided to an assistant for preparation of an envelope in which the contents will be inserted, along with any desired instructions specific to that mail piece for sending the mail piece to the intended recipient. Such instructions could include, for example, specific mailing instructions, e.g., type of service (next day, two-day, etc.), or the like, or any type of value added services, e.g., insurance, certified mail, registered mail, return receipt, signature confirmation, delivery confirmation, or the like, that are desired for the mail piece. For some instructions, the sender (or the sender's assistant) would be required to fill out one or more forms, apply special labels to the mail piece, manually log information for tracking (if requested), and in some cases, actually bring the mail piece to a post office for processing.

Once the mail piece, including envelope and contents, has been completed, the mail piece is typically sent to a mail room for final processing before giving the mail piece to the postal service or other carrier. The mail room is typically where the mail processing systems as described above are located and used by mail room personnel to finish the mail piece and apply an indicium evidencing payment for delivery of the mail piece. Because of the numerous options available to senders for sending a mail piece, e.g., carrier, type of service, value added services, etc., the mail room personnel must first pre-sort each of the mail items received by trying to determine the sender's mailing intent for each mail piece and placing them into batches of mail pieces having similar delivery requests. The mail room personnel must then manually input information into the mail processing systems to ensure that the senders' requests with respect to the mail pieces are honored and the proper account is billed for the charge, before processing the mail pieces through the mail processing systems. For example, if a sender requested a value added service that has an additional fee, the mail room personnel must enter this information into the mail processing system such that the requested value added service is accounted for and an appropriate indicium is printed on the mail piece. The mail piece can then be provided to the selected carrier for delivery.

The above described process for generating and mailing a mail piece presents serious limitations with respect to processing mail pieces. The process requires significant manual labor, including the sender (or sender's assistant) having to manually fill out forms indicating desired delivery instructions for each mail piece. For professionals that generate large amounts of mail pieces, a significant amount of time each day can be spent performing such tasks. The amount of labor required by the mail room personnel to presort the mail pieces and input information with respect to each mail piece is also significant. The amount of manual labor required overall is cumbersome and can be prone to errors. For mail rooms located in large offices where hundreds or even thousands of mail pieces are generated each day, most of the mail room personnel's time can be spent doing these tasks, leading to a very inefficient use of time and resources.

Thus, there exists a need for a method and system that allows a sender of a mail piece to easily specify delivery instructions and/or services for a mail piece and that allows mail processing systems to identify and account for the specified delivery instructions and/or services without the need for any pre-sorting or input of information prior to processing the mail piece.

SUMMARY OF THE INVENTION

The present invention alleviates the problems associated with the prior art and provides methods and systems that allow a sender of a mail piece to easily specify delivery instructions and/or services for a mail piece and that allows mail processing systems to identify and account for the specified delivery instructions and/or services without the need for any pre-sorting or input of information prior to processing the mail piece.

In accordance with embodiments of the present invention, the sender of a mail piece provides a marking on the mail piece representing instructions desired for delivering the mail piece. Optionally, the marking can also provide an identification of the sender, a billing code, and/or a unique identification for the mail piece. The marking can be applied in a plurality of different ways, such as, for example, by a printer, pre-printed labels, ink-stamp, removable labels, etc. The marking can include, for example, an identification number (which may be in machine readable format) and can utilize different colors to differentiate between different delivery instructions. A mail processing system utilized to process the mail piece reads the marking provided on the mail piece, and based on the type/color of the marking, interprets the delivery instructions requested by the sender. The mail processing system can then process the mail piece according to the instructions requested by the sender based on the marking provided on the mail piece by the sender. Processing can include, for example, determining which carrier will meet all of the service requests made by the sender, providing any necessary markings or labels for the selected carrier and services, following billing instructions for the mail piece, accounting for any requested special or value added services and printing an appropriate indicium. By utilizing the present invention, no manual pre-sorting of mail pieces is required, nor is the mail room personnel required to input any information into the mail processing system, before feeding mail pieces into the mail processing system.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate a presently preferred embodiment of the invention, and together with the general description given above and the detailed description given below, serve to explain the principles of the invention. As shown throughout the drawings, like reference numerals designate like or corresponding parts.

DETAILED DESCRIPTION OF THE DRAWING INVENTION

Figure 1:
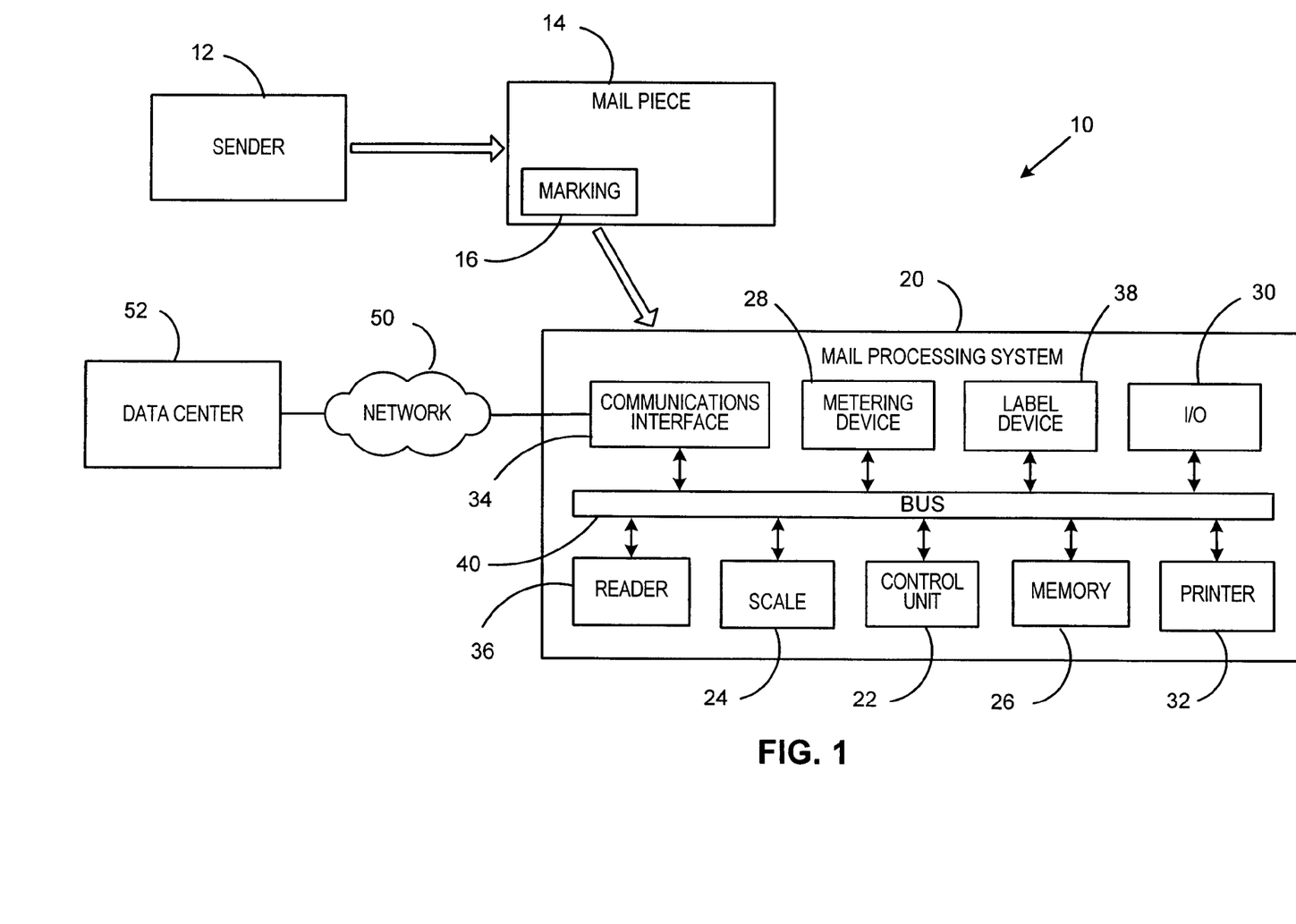
FIG. 1 illustrates in block diagram form a system for processing mail pieces according to an embodiment of the present invention.

In describing the present invention, reference is made to the drawings, wherein there is seen in FIG. 1 a system 10 for processing mail pieces according to an embodiment of the present invention. System 10 includes a sender 12 that generates a mail piece 14. Sender 12 could be, for example, a business person or office worker and/or assistant, that generates mail pieces, such as mail piece 14, for delivery to an intended recipient. The sender 12 can utilize, for example, a personal computer, word processor, or the like to generate mail piece 14. Mail piece 14 includes some content, e.g., letter, advertisement, brochure, or the like, and an envelope. The sender 12 applies a marking 16, as further described below, to the mail piece 14. The marking 16 is utilized by the mail processing system 20 to process the mail piece 14 such that a carrier will deliver the mail piece 14 to the intended recipient. In the manner requested by the sender 12 the carrier could include governmental agencies, e.g., the United States Postal Service (USPS) or similar postal authority, or a private or commercial carrier.

Mail processing system 20 includes a control unit 22, such as, for example, a microprocessor or the like, that controls operation of the system 20 using data and code instructions stored in memory 26. A scale 24 is provided to weigh mail pieces being processed by the system 20. Scale 24 is preferably integral to the system 20, such that mail pieces can be weighed as they are being transported through the system 20. A metering device 28 is provided to account for funds when charges for carrier delivery are determined and dispensed in the form of an indicium provided on a mail piece. Instructions are received/provided to a user of the system 20 via an input/output device 30, such as, for example, a keyboard and display device. The system 20 further includes a printer 32 used to print information directly onto mail pieces that are being processed by the system 20, or onto labels that can be provided from a label device 38 or fed into the system 20 by an operator. The label device 38 can also apply labels directly to a mail piece if desired, or provide labels to a user for application to a mail piece. Label device 38 can also remove labels that are already secured to a mail piece as will be described further below. A reader 36 is provided to read the marking 16 provided on a mail piece 14. The reader 36 could be, for example, a scanner, a camera for obtaining an image, a spectrometer to determine color, or any combination thereof. The reader 36 could be integral to the system 20 or could be a separate hand-held device that interfaces with the system 20. Mail processing system 20 further includes a communications interface 34, such as a modem or network connection or the like, that allows the system 20 to communicate with a data center 52 via a network 50. Each of the components of the system 20 can communicate with other components via a bus 40 or other similar communication means.

Figure 2:
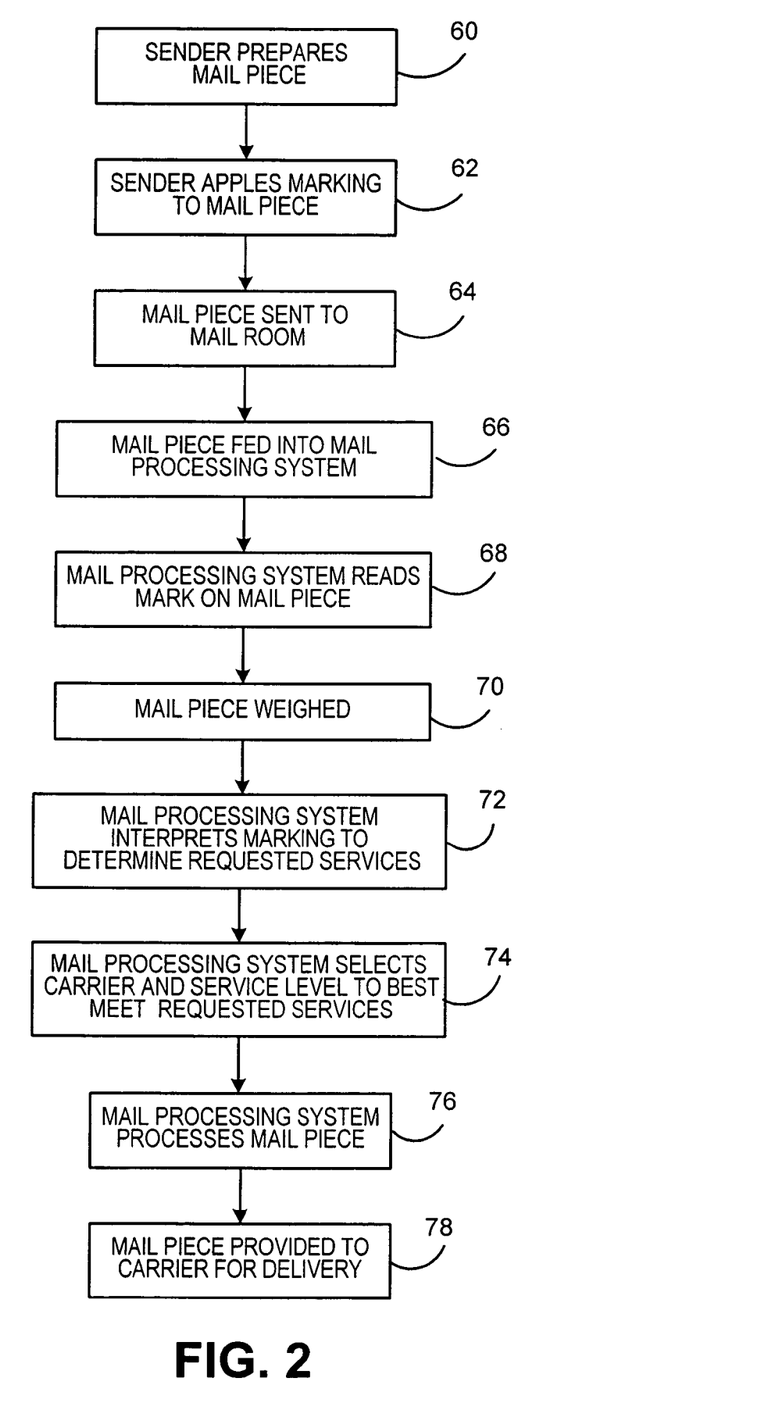
FIG. 2 illustrates in flow diagram form the operation of the system of FIG. 1 according to an embodiment of the present invention.
Figure 3:
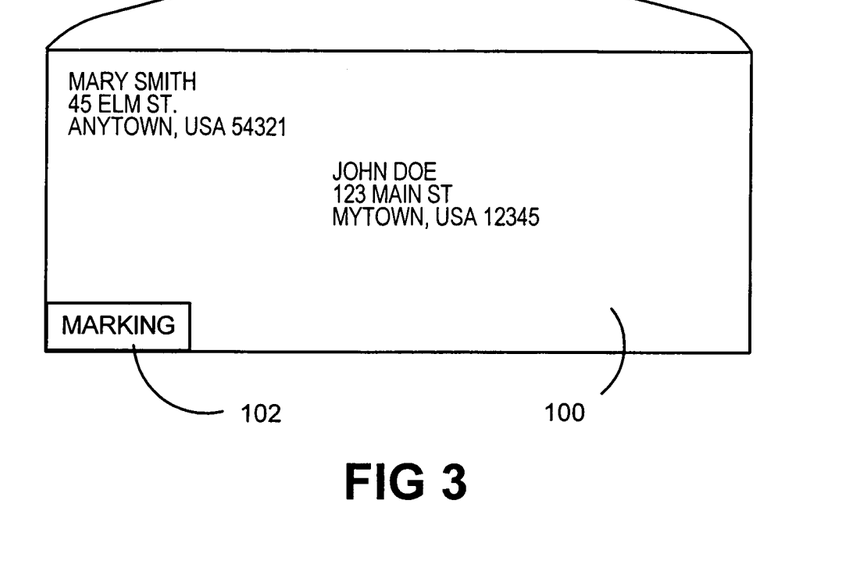
FIG. 3 illustrates an example of a mail piece having a marking according to an embodiment of the present invention.

FIG. 2 illustrates in flow diagram form the processing of a mail piece 14 by the system 10 illustrated in FIG. 1 according to an embodiment of the invention. In step 60, the sender 12 prepares a mail piece for delivery. The mail piece could include, for example, a letter, brochure, advertisement, or the like, and can be prepared using a personal computer, word processor or the like. The sender 12 also determines the type of services desired for delivering the mail piece, such as, for example, service level and value added services. In step 62, the sender applies a marking, as described below, to the envelope of the mail piece that represents the desired services. FIG. 3 illustrates an example of a mail piece 100 with a marking 102 applied in the lower left hand corner. The marking 102 could also be applied to the back of the envelope or any other portion of the envelope as desired that complies with any carrier regulations. Preferably, the marking 102 identifies the sender 12, and also preferably provides a unique identification number for the mail piece. The marking 102 can also optionally identify a billing account associated with the sender 12. The sender identification and identification number for the mail piece are preferably provided in machine readable format, such as, for example, a barcode. Alternatively, the sender identification and/or identification number for the mail piece can be provided as a string of characters, numbers, symbols, or any combination thereof. The identification of the sender 12 and an identification number for the mail piece can be used for tracking purposes of the mail piece as described below.

The marking 102 applied by the sender 12 in step 62 also specifies the type of service or suite of services requested by the sender 12 for delivery of the mail piece. According to some embodiments, the marking 102 is color coded with one or more different colors that correspond to the different types of services or suite of services that might be requested. In one embodiment, the marking 102 is provided by different colored removable flags that are affixed to the mail piece. Each color for the different flags represents a different suite of services associated with delivering a mail piece. For example, a green flag may indicate that the sender 12 desires the mail piece to be delivered within-two days by registered mail. A red flag may indicate that the sender desires the mail piece to be delivered the next day with delivery confirmation. It should be understood, of course, that any suite of services can be assigned a color based on the needs and typical usage patterns of the sender 12. Optionally, if the sender 12 is requesting a value added service that requires a special envelope or special marking provided on the envelope, the envelopes can be provided with a preprinted fluorescent color stripe along the top edge that matches the color of the removable flag associated with that value added service request, thereby enabling the sender 12 to easily select the appropriate special envelope. Each removable flag preferably includes the sender identification and a unique identification number for the mail piece as described above. Alternatively, the sender identification and unique mail piece identification number can be provided in other forms, such as, for example, pre-printed on the envelope, pre-printed label affixed to the envelope, rubber stamp, etc.

Figure 4:
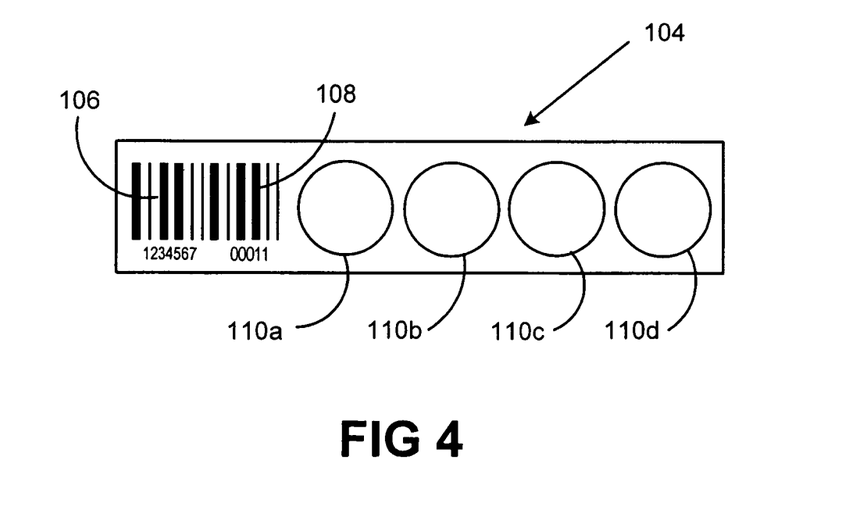
FIG. 4 illustrates an example of a marking according to an embodiment of the present invention.

According to another embodiment, the marking 102 includes one or more different colored dot stickers that are affixed to the mail piece. Each colored dot sticker represents a service request for delivery of the mail piece. For example, a first set of colors could correspond to the type of delivery requested as follows: a first color could indicate overnight delivery, a second color could indicate one to two day delivery, a third color could indicate one to three day delivery, and a fourth color could indicate the delivery is not time sensitive. Other colored dot stickers could be used to indicate any value added services desired for the mail piece. FIG. 4 illustrates an example of a marking 104 according to this embodiment. A sender 12 would be provided with a sheet of the markings 104 as illustrated in FIG. 4, along with one or more sheets of different colored dot stickers, with each color representing a different type of service or value added service. Optionally, the type of service or value added service associated with each dot sticker could be provided in human readable form within each dot sticker. The marking 104 includes a barcode 106 that identifies the sender, a barcode 108 that provides a unique identification number for the mail piece, and one or more spaces 110a-110d (four illustrated in FIG. 4) for the sender to place the dot stickers to indicate the type of service requested. Each of the spaces 110a-110d may be associated with a different selection, e.g., the dot sticker in space 110a may represent type of delivery, the dot sticker in space 110b may represent services associated with delivery, e.g., registered mail, certified mail, delivery confirmation, etc., the dot sticker in space 110c may represent insurance amount, and so forth. In this manner, the same colors can be used to indicate different requests based on the location the dot stickers are placed in the marking 104. Alternatively, of course, each different type of request could be associated with a different color, and the location in which the dot stickers are placed on the marking 104 would not have any significance.

Suppose, for example, that the sender 12 was given a sheet of dot stickers that indicated the colored dots represent the following requests: red indicates overnight delivery, orange indicates one to two day delivery, yellow indicates one to three day delivery, green indicates the delivery is not time sensitive, blue indicates registered mail, indigo indicates certified mail, violet indicates delivery confirmation, brown indicates signature confirmation, and tan indicates insurance. It should be understood, of course, that the different colors can be assigned as desired, and only those services typically used by the sender 12 could be assigned a color. If the sender 12 desires to send a mail piece by one to two day delivery, with delivery confirmation and insurance, the sender 12 will apply an orange dot sticker, a violet dot sticker, and a tan dot sticker to the marking 104 in the spaces 110a-110c, thus indicating the services desired by the sender 12. Optionally, if the sender 12 is requesting a value added service that requires a special envelope or special marking on the envelope, the envelopes can be provided with a preprinted fluorescent color stripe along the top edge that matches the color of the dot sticker associated with that value added service request, thereby enabling the sender 12 to easily select the appropriate special envelope. The system 20 could then generate any required carrier barcodes for that value added service request, and the printer 32 could print the barcode below the fluorescent stripe.

According to another embodiment, instead of using the different color dot stickers, different color ink pens or markers could be used to fill in one or more spaces 110a-110d in the marking 104 to indicate the services being requested. Optionally, instead of using the whole marking 104, only a portion of the marking 104 that includes the sender identification barcode 106 and unique identification for the mail piece barcode 108 can be used, and the sender 12 can simply make marks with the ink pens that correspond to the desired services next to the barcode 108. The sender identification and unique identification for the mail piece could also be provided in other forms, such as, for example, with a rubber stamp, pre-printed on the envelope, etc.

According to another embodiment, the marking 102 is provided by a rubber stamp. Preferably, the rubber stamp is issued specifically to the sender 12, and includes a fixed portion that identifies the sender 12, and an incremental counter to provide an identification for each mail piece. Alternatively, the stamp does not include the sender identification or mail piece identification and this information is provided in a different manner, e.g., label, pre-printed, etc. The rubber stamp is provided with plurality of positions selectable by the sender 12, with each position representing a different type of service requested. The sender 12 is able to select the service desired by rotating the stamp head or turning a knob on the stamp. Preferably, the information printed by the stamp is provided in machine readable format, such as, for example, a barcode. Alternatively, the information printed by the stamp can be provided as a string of characters, numbers, symbols, or any combination thereof.

According to another embodiment, the marking 102 is generated by a software program being executed by a personal computer used by the sender 12, and the marking 102 is printed either directly on the mail piece by a printer coupled to the personal computer or on an adhesive label that is secured to the mail piece by the sender 12. The software program could be, for example, an envelope creation program that also prints addressee and return address information in addition to the marking 102. The sender 12 is asked to input information identifying the services desired for delivering the mail piece, and a marking 102 is generated by the software program. The marking 102 identifies the sender 12, and also preferably provides a unique identification number for the mail piece. The marking 102 also includes the type of service or suite of services requested by the sender 12 for delivery of the mail piece. The marking 102 is preferably provided in machine readable format, such as, for example, a barcode. Alternatively, the marking 102 can be provided as a string of characters, numbers, symbols, or any combination thereof. The printer can also be used to print any required markings on the envelope for value added services using fluorescent ink based on the services requested by the sender 12.

Figure 5:
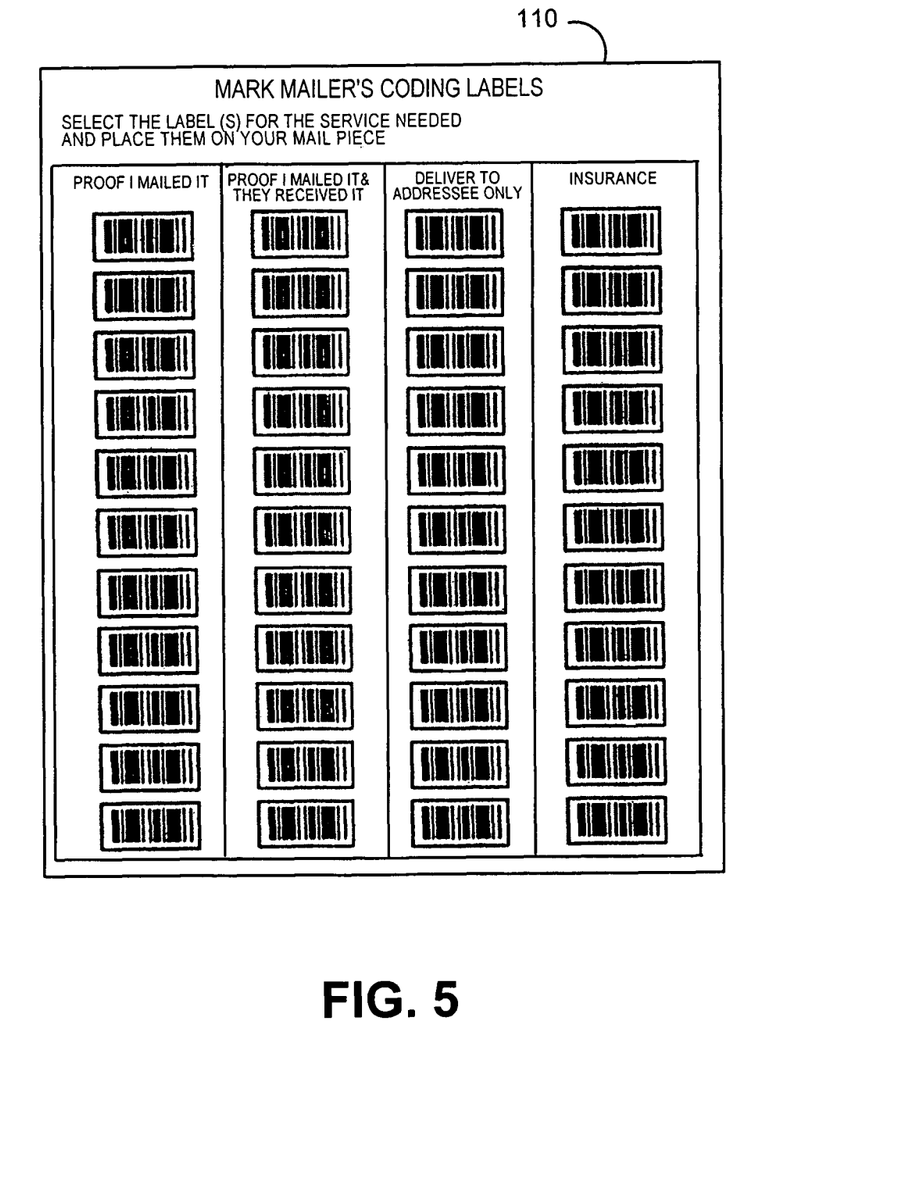
FIG. 5 illustrates an example of a sheet of preprinted markings according to an embodiment of the present invention.

According to another embodiment, the marking 102 is provided as a preprinted label that the sender 12 affixes to the mail piece. FIG. 5 illustrates an example of a sheet 110 of preprinted markings according to this embodiment. Each label on the sheet 110 is provided with an identification of the sender 12 and optionally a billing account associated with the sender 12, and also preferably provides a unique identification number for the mail piece. Each label on the sheet 110 also includes the type of service or suite of services requested by the sender 12 for delivery of the mail piece. The labels on the sheet 110 are preferably provided in machine readable format, such as, for example, a barcode as illustrated in FIG. 5. Alternatively, the labels can be provided as a string of characters, numbers, symbols, or any combination thereof. The sender 12 selects an appropriate label from the sheet 110, based on the services desired for the mail piece, and secures it to the mail piece in the proper location.

Once the marking 102 has been applied to the mail piece 100 in step 62, the mail piece 100 is ready to be sent to the mail room for processing. In step 64, the mail piece 100 is sent to the mail room for processing using an automated mail processing system, such as mail processing system 20 illustrated in FIG. 1, to determine cost for delivery of the mail piece 100, account for the cost, and generate and print an indicium on the mail piece 100 to evidence payment. In step 66, the mail piece 100 is fed into the mail processing system 20. Note that the mail piece 100 does not need to be manually sorted by the mail room personnel, nor does any information need to be input by the mail room personnel into the mail processing system 20, before the mail piece 100 is fed into the mail processing system 20. In step 68, the mail processing system 20 reads the marking 102, provided on the mail piece 100 in any manner as described above with respect to step 62, using the reader 36. As noted above, the reader 36 could be, for example, a scanner, a camera for obtaining an image, a spectrometer to determine color, or any combination thereof, thereby allowing any barcodes, symbols, characters to be read and different colors to be determined. The information obtained by the reader 36 is sent to the control unit 22. Optionally, if it is necessary to weigh the mail piece 100, in step 70 the mail piece 100 can be weighed using the scale 24. The weight of the mail piece 100 is provided to the control unit 22.

In step 72, the control unit 22 interprets the data received from the reader 36 and scale 24, if provided, to determine the service (or services) requested by the sender 12. The control unit 22 will then, in step 74, based upon the services requested by the sender 12 and optionally one or more pre-determined business rules, previously loaded into the system 20 through I/O device 30 or via network 50, determine the carrier, from one or more available carriers, and/or service level offered by the selected carrier that will best meet the desired delivery request(s) made by the sender 12. The different carriers and pre-determined business rules could be stored, for example, in memory 26. The list of carriers could include carriers that are fully supported by the mail processing system 20, thereby allowing the mail processing system 20 to fully process the mail piece by accounting for the mail piece and placing all required markings on the mail piece for delivery directly to the carrier. The list of carriers could also include carriers that are not fully supported by the mail processing system 20, e.g., some additional processing must be performed by the mail room personnel to use an unsupported carrier. Such additional processing could include, for example, having to fill out a form or have mail processing system 20 print a form or label to be applied to the mail piece, enter information onto the mail piece, or the like. The business rules could be established based on guidelines that mandate the selection of a specific carrier or type of service in certain situations. For example, the sender's company may have negotiated lower rates with one or more carriers for specific types of services. Thus, if a mail piece is going to be sent by next day delivery, the business rules require that a specific carrier always be used, regardless of any other services requested. If the pre-determined business rules are not applied, the control unit 22 preferably selects a carrier that best meets the service requests made by the sender 12 in conjunction with minimum cost for such services. Thus, the control unit 22 will determine the applicable rate for the mail piece 100, based on the weight of the mail piece 100 from scale 24 (if provided), the services requested for delivery of the mail piece 100, and one or more rate tables that can be stored, for example, in memory 26. The control unit 22 can then select the best available rate and select a carrier accordingly.

Once a carrier and/or service level has been determined in step 74, then in step 76 the mail processing system 20 will process the mail piece 100 for the selected carrier and service level. Such processing can include, for example, accounting for the applicable fees for delivery of the mail piece 100. The accounting could occur by deducting funds from one or more registers within the metering device 28. Accounting could also occur by the mail processing system 20 contacting a remote data center 52, via communications interface 34 and network 50, and requesting a transfer of funds from an account of the sender 12 (or sender's company) to the carrier. Alternatively, if a post-payment accounting system is used, accounting could also occur by logging the transaction into the data center 52, from which a subsequent bill will be generated and sent to the sender 12. The control unit 22 can also use the identification of the sender 12 or the billing account (if provided) from the marking 102 to perform accounting within an account associated specifically with the sender 12 or with the sender's department (departmental accounting).

Processing the mail piece 100 can also include generating an indicium, using the metering device 28, that evidences payment for delivery of the mail piece 100, and printing the generated indicium on the mail piece 100, or a label for affixing to the mail piece 100, using the printer 32. The label could be provided, for example, from the label device 38. Processing of the mail piece 100 can also include providing any markings required by the selected carrier to indicate the delivery services for the mail piece 100. Such markings can be printed by the printer 32, either directly on the mail piece 100 or on a label for affixing to the mail piece 100. The labels may be provided by the label device 38. Label device 38 can provide a plurality of different label stocks, depending upon the service being provided. The control unit 22 will determine which label should be applied, based on the service request, and apply the proper label to the mail piece 100. The printer 32 can then print any additional required markings onto the label. Optionally, the printer 32 can utilize multiple print heads with special inks, e.g., different color inks or fluorescent inks, to provide the markings, if required by the selected carrier.

Processing of the mail piece 100 could also include saving an image of the mail piece 100 (if an image was captured) and associating the image with the identification of the sender 12. The image could be saved, for example, in memory 26 and subsequently downloaded to or retained by data center 52 or another database, such as, for example, a PC server. The sender 12 could have access, via a web site or the like, to any images associated with the sender 12 to aid in tracking of the mail piece 100. Additionally, if a tracking service has been selected, processing of the mail piece 100 can include associating the identification of the sender 12 with a tracking number applied to the mail piece 100 (using either the label device 38 or printer 32 as described above). Since the identification of the sender 12 is known, automatic updates on the status of the mail piece 100 can be provided to the sender 12, utilizing, for example, e-mail, to aid in the tracking of the mail piece 100.

If the control unit 22 selects a carrier for which additional processing is required by the mail room personnel, processing of the mail piece 100 could also include providing a signal to the mail room personnel, using, for example, the I/O device 30, to indicate that the mail piece 100 requires additional attention by the mail room personnel.

If the marking 102 was applied using the removable flags as described above, processing of the mail piece 100 could also include removing the flag from the mail piece 100. Such removal could be performed, for example, using a stripping blade or the like which the mail piece 100 is passed under. The stripping blade scrapes the surface of the mail piece 100 to remove the flag from the mail piece 100.

Once the necessary processing for the mail piece 100 has been performed in step 76, then in step 78 the mail piece 100 is provided to the selected carrier (or an agent of the carrier) for delivery to the intended recipient. By utilizing the present invention, the amount of labor required to process the mail piece 100 for delivery by the carrier has been significantly reduced or in most cases entirely eliminated. The mail piece 100 includes any necessary markings to indicate the services for delivery of the mail piece, and the accounting of the fees associated with those services has been properly performed. The mail room personnel did not have to presort the mail piece 100 into a batch with similar mail pieces, or input any information into the mail processing system 20 prior to processing the mail piece 100. The identity of the sender 12, a unique identification number for the mail piece 100, and the desired services are determined based on the marking 102 placed on the mail piece 100, which is then read by the mail processing system 20 and acted on accordingly. This results in a significant saving of time and labor, thereby enabling more efficient processing of mail pieces by the mail room personnel and improved throughput. Additionally, the sender 12 can view a record of their mail to determine when it was processed by the system 20 and confirm the desired services were selected for the mail piece by the system 20.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description.

What is claimed is:

1. A method for a mail processing machine to process a mail piece prepared by a sender, the mail piece including a marking indicating desired delivery options requested by the sender, the method comprising:
    reading, by the mail processing machine, the marking on the mail piece;
    interpreting, by the mail processing machine, the marking read from the mail piece to determine an identification of the sender and delivery options for the mail piece desired by the sender;
    obtaining, by the mail processing machine, an image of the mail piece and storing the image of the mail piece in association with the identification of the sender;
    determining, by the mail processing machine based on the interpretation of the marking read from the mail piece, at least one carrier and associated carrier service level that meets the delivery options desired by the sender;
    determining, by the mail processing machine, a rate for the mail piece for delivering the mail piece by each of the at least one carrier and associated carrier service level that meets the desired delivery options;
    selecting, by the mail processing machine, a carrier and associated carrier service level from the at least one carrier and associated carrier service level based on the determined rates and predefined business rules for carrier selection;
    accounting, by the mail processing machine, for the determined rate for the selected carrier and associated carrier service level;
    generating, by the mail processing machine, an indicium for the mail piece based on the determined rate; and
    printing, by the mail processing machine, the generated indicium for the mail piece.

2. The method according to claim 1, wherein the marking includes one or more colors that represent delivery options for the mail piece.

3. The method according to claim 2, wherein reading the marking on the mail piece further comprises:
    reading the marking with a spectrometer to determine the one or more colors of the marking on the mail piece.

4. The method according to claim 2, wherein the marking includes a removable flag.

5. The method according to claim 4, further comprising:
    scraping the removable flag from the mail piece using a stripping blade as the mail piece is processed by the mail processing machine.

6. The method according to claim 2, wherein the marking includes a dot sticker.

7. The method according to claim 2, wherein the marking includes marks made by an ink marker.

8. The method according to claim 1, wherein the marking is stamped on the mail piece.

9. The method according to claim 1, wherein the marking is a label applied to the mail piece.

10. The method according to claim 1, wherein the marking is printed on the mail piece.

11. The method according to claim 1, wherein accounting for the determined rate for the selected carrier and associated carrier service level further comprises:
    accounting for the determined rate for the selected carrier and associated carrier service level to an account associated with the sender based on the identification of the sender.

12. The method according to claim 1, wherein the marking includes an identification number for the mail piece.

13. The method according to claim 12, further comprising:
    associating the identification of the sender and identification number for the mail piece with a tracking number for the mail piece.

14. The method according to claim 1, further comprising:
    adding at least one marking required by the selected carrier to indicate a delivery option to the mail piece.

15. The method according to claim 1, further comprising:
    weighing the mail piece,
    wherein the determined rate for the mail piece is based on the weight of the mail piece.

16. A mail processing system for processing a mail piece prepared by a sender, the mail piece including a marking indicating desired delivery options requested by the sender, the mail processing system comprising:
    an imaging device to obtain an image of the mail piece and to read the marking on the mail piece;

means for interpreting the marking read from the mail piece to determine an identification of the sender and delivery options for the mail piece desired by the sender;

a memory device for storing the image of the mail piece in association with the identification of the sender;

means for determining, based on the interpretation of the marking read from mail piece, at least one carrier and associated carrier service level that meets the delivery options desired by the sender;

means for determining a rate for the mail piece for delivering the mail piece by each of the at least one carrier and associated carrier service level that meets the desired delivery options;

means for selecting a carrier and associated carrier service level from the at least one carrier and associated carrier service level based on the determined rates and predefined business rules for carrier selection, and accounting for the determined rate for the selected carrier and associated carrier service level a metering device to generate an indicium for the mail piece based on the determined rate; and a printing device to print the generated indicium for the mail piece.

17. The mail processing system according to claim 16, wherein the marking includes one or more colors that represent delivery options for the mail piece.

18. The mail processing system according to claim 17, wherein the reading device includes a spectrometer to determine the one or more colors of the marking on the mail piece.

19. The mail processing system according to claim 17, wherein the marking includes a removable flag.

20. The mail processing system according to claim 19, further comprising:

a label removing device to remove the removable flag from the mail piece as the mail piece is processed by the mail processing machine.

21. The mail processing system according to claim 17, wherein the marking includes a dot sticker.

22. The mail processing system according to claim 17, wherein the marking includes marks made by an ink marker.

23. The mail processing system according to claim 16, wherein the marking is stamped on the mail piece.

24. The mail processing system according to claim 16, wherein the marking is a label applied to the mail piece.

25. The mail processing system according to claim 16, wherein the marking is printed on the mail piece.

26. The mail processing system according to claim 16, wherein the marking includes an identification of the sender.

27. The mail processing system according to claim 16, wherein the reading device includes a camera.

28. The mail processing system according to claim 16, wherein the reading device includes a scanner.

* * * * *